(12) United States Patent
Epp

(10) Patent No.: US 11,812,679 B2
(45) Date of Patent: Nov. 14, 2023

(54) ADAPTER OF AN AGRICULTURAL IMPLEMENT AND AGRICULTURAL IMPLEMENT

(71) Applicant: CLAAS Saulgau GmbH, Bad Saulgau (DE)

(72) Inventor: Siegfried Epp, Eberhardzell (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 246 days.

(21) Appl. No.: 17/146,121

(22) Filed: Jan. 11, 2021

(65) Prior Publication Data

US 2021/0212247 A1 Jul. 15, 2021

(30) Foreign Application Priority Data

Jan. 15, 2020 (DE) .......................... 102020100871.6

(51) Int. Cl.
| | | |
|---|---|---|
| A01B 59/042 | (2006.01) | |
| B60D 1/07 | (2006.01) | |
| B60D 1/14 | (2006.01) | |
| A01B 59/00 | (2006.01) | |

(52) U.S. Cl.
CPC .......... *A01B 59/042* (2013.01); *A01B 59/002* (2013.01); *A01B 59/008* (2013.01); *B60D 1/075* (2013.01); *B60D 1/141* (2013.01)

(58) Field of Classification Search
CPC ... A01B 59/042; A01B 59/062; A01B 59/008; A01B 59/002; A01B 59/066; B60D 1/141; B60D 1/075; B60D 2001/008
USPC ....................................................... 172/272
See application file for complete search history.

(56) References Cited

U.S. PATENT DOCUMENTS

| | | | | |
|---|---|---|---|---|
| 2,674,169 A | * | 4/1954 | Sawyer ............... | F16C 11/0614 403/324 |
| 2,743,117 A | * | 4/1956 | Hutchings ............ | A01B 59/062 172/272 |
| 3,066,952 A | * | 12/1962 | Price ....................... | B60D 1/07 172/248 |
| 3,231,294 A | * | 1/1966 | Horney ................ | A01B 59/062 172/272 |
| 3,472,528 A | | 10/1969 | Richey et al. | |
| 4,195,860 A | * | 4/1980 | Helams ................ | A01D 67/005 56/503 |
| 5,690,182 A | * | 11/1997 | Ward ................... | A01B 59/043 280/416.2 |
| 7,029,019 B1 | * | 4/2006 | Dye ........................ | B60D 1/06 280/416.2 |
| 7,487,843 B2 | * | 2/2009 | Tuttle et al. .......... | A01B 59/062 172/446 |

FOREIGN PATENT DOCUMENTS

| | | | | |
|---|---|---|---|---|
| DE | 1957228 A1 | * | 5/1971 | ........... A01B 59/008 |
| DE | 102013208279 A1 | * | 11/2014 | ........... A01B 59/008 |
| EP | 3095309 A1 | * | 11/2016 | ........... A01B 59/008 |

\* cited by examiner

*Primary Examiner* — Thomas B Will
*Assistant Examiner* — Joel F. Mitchell

(57) ABSTRACT

Adapter (27) of an agricultural implement, having a first, cylindrically contoured section (27a), the external diameter of which is designed to couple the agricultural implement to a US quick-hitch attachment system of an agricultural support vehicle, and having a second, spherically contoured section (27b), the external diameter of which is designed to couple the agricultural implement to a European lower-link attachment system of an agricultural support vehicle.

14 Claims, 11 Drawing Sheets

ADAPTER OF AN AGRICULTURAL IMPLEMENT AND AGRICULTURAL IMPLEMENT

The invention relates to an adapter of an agricultural implement and an agricultural implement In agricultural machinery technology, it is usual for an agricultural implement to have to be coupled to an agricultural support vehicle. The agricultural support vehicle can have, for example, a US quick-hitch attachment system or a European lower-link attachment system, to which an implement can be coupled. Depending on whether the support vehicle has a US quick-hitch attachment system or a European lower-link attachment system, the implement must have an appropriate adapter in order to couple the implement to the support vehicle via the adapter.

Since a distinction is drawn not only between US quick-hitch attachment systems and European lower-link attachment systems as such but there are also respectively different categories for these attachment systems, it is in practice necessary to provide a large number of different adapters for an agricultural implement in order to be able to couple the same also to the corresponding attachment system of the agricultural support vehicle.

There is a need to provide an adapter of an agricultural implement which permits flexible coupling of the implement to different attachment systems of a support vehicle.

On this basis, the present invention is based on the object of devising a novel type of adapter for an agricultural implement and an agricultural implement.

This object is achieved by an adapter according to claim 1.

According to the invention, the adapter has a first, cylindrically contoured section, the external diameter of which is designed to couple the agricultural implement to a US quick-hitch attachment system of an agricultural support vehicle, and a second, spherically contoured section, the external diameter of which is designed to couple the agricultural implement to a European lower-link attachment system of an agricultural support vehicle.

The invention presents an adapter of an agricultural implement which permits flexible attachment of an agricultural implement to different attachment systems of an agricultural support vehicle, specifically both to a US quick-hitch attachment system and to a European lower-link attachment system. Accordingly, it is no longer necessary to stock different adapters for different attachment systems of support vehicles According to an advantageous development of the adapter, the adapter is formed as a one-piece adapter bush which has a recess via which said one-piece adapter bush can be pushed onto a carrier pin. This configuration of the adapter is particularly preferred in order to couple an agricultural implement to different attachment systems of an agricultural support vehicle in a simple way by using the adapter. For the adaptation, the adapter merely has to be pushed onto the carrier pin in a defined orientation.

According to a further advantageous development of the adapter, a first run-on disk with a run-on bevel facing the cylindrically contoured section is formed on a first side of the cylindrically contoured section, wherein a second run-on disk having a run-on bevel facing the cylindrically contoured section and, preferably in addition, a run-on bevel facing the spherically contoured section, is formed on a second side of the cylindrically contoured section. The run-on disks make it easier to couple the implement to the support vehicle, specifically to couple the attachment system of the support vehicle to the adapter of the implement.

According to a further advantageous development of the adapter, the cylindrically contoured section has a length which corresponds to the width of the US quick-hitch attachment system, in particular the length of a US quick-hitch attachment system of Category 2 or Category 3N or Category 3, wherein the spherically contoured section has a diameter which corresponds to the diameter of the European lower-link attachment system, in particular the diameter of a European lower-link attachment system of Category II or Category III. This dimensioning of the adapter is particularly preferred in order to ensure the flexibility of the same with regard to the coupling of an implement to different attachment systems.

The agricultural implement according to the invention is defined in claim 9. The agricultural implement according to the invention has holders and adapters according to the invention which are mounted on the holders. Such an implement can be coupled flexibly to different attachment systems of an agricultural support vehicle.

According to a further advantageous development of the agricultural implement, the respective holder has two lugs spaced apart from each other, on which the respective adapter is mounted. This embodiment is preferred in order to couple the implement to an agricultural support vehicle by using the adapter.

According to a further advantageous development of the agricultural implement, a lateral spacing between two lugs facing each other of the holders of the implement corresponds at most to an internal dimension of a hook spacing of the US quick-hitch attachment system. A lateral spacing between lugs facing away from each other of the holders of the implement corresponds at least to an external dimension of the hook spacing of the US quick-hitch attachment system. This dimensioning of the spacing between the respective lugs of the holders of the agricultural implement is particularly preferred in order to ensure the desired flexibility when coupling an agricultural implement to an agricultural support vehicle.

According to a further advantageous development of the agricultural implement, the lugs, as seen in the insertion direction of the attachment system, have insertion bevels. This development is preferred in order to permit the coupling of the attachment system of the agricultural support vehicle to the adapter of the agricultural implement via the insertion bevels.

Preferred developments of the invention emerge from the sub-claims and the following description. Exemplary embodiments of the invention will be explained by using the drawings, without being restricted thereto. In the drawing:

The invention relates to an adapter of an agricultural implement and an agricultural implement.

Figure 1:
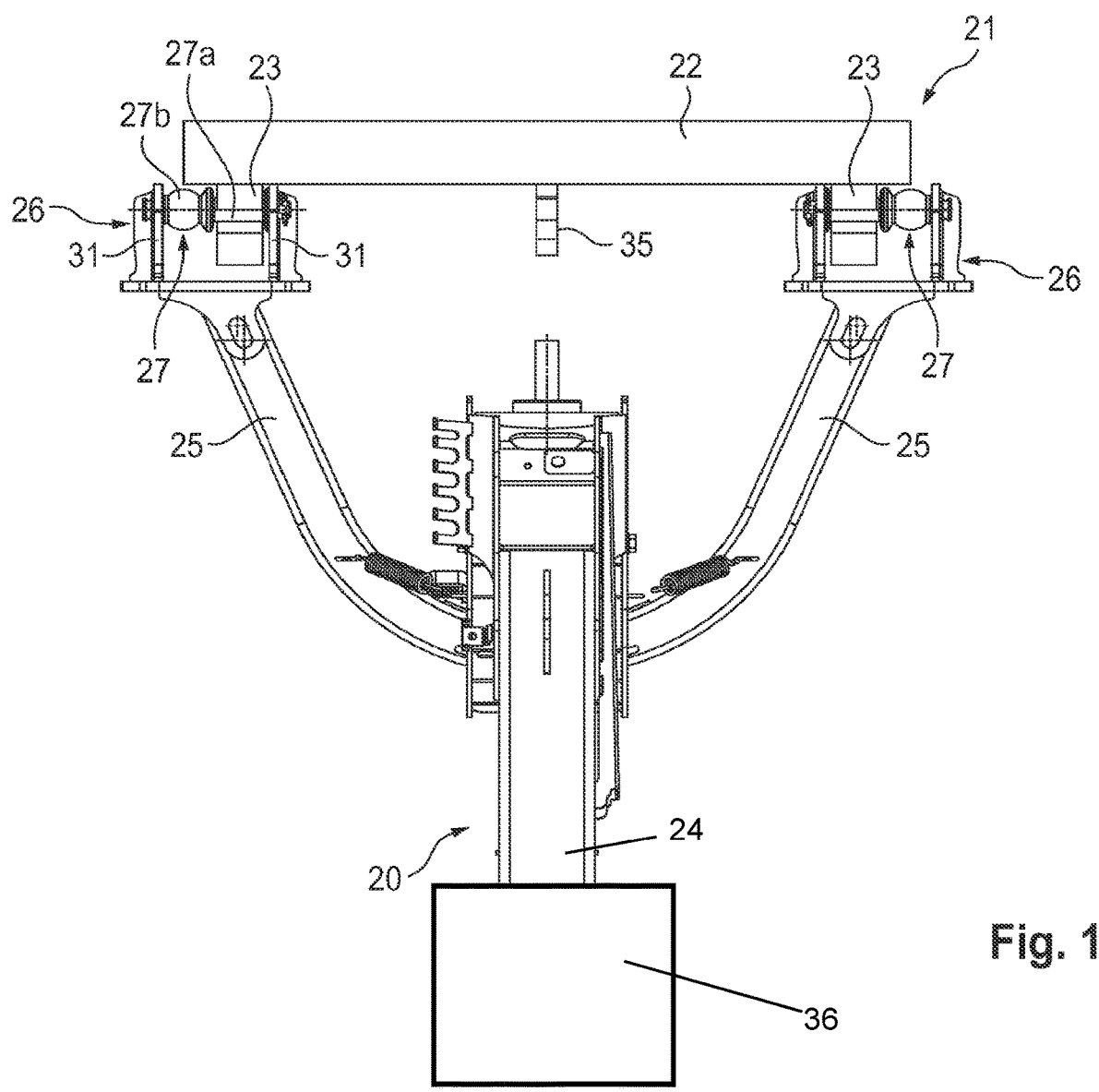
FIG. 1 shows a detail of an agricultural implement according to the invention together with a US quick-hitch attachment system of Category 2 or Category 3N in plan view.
Figure 2:
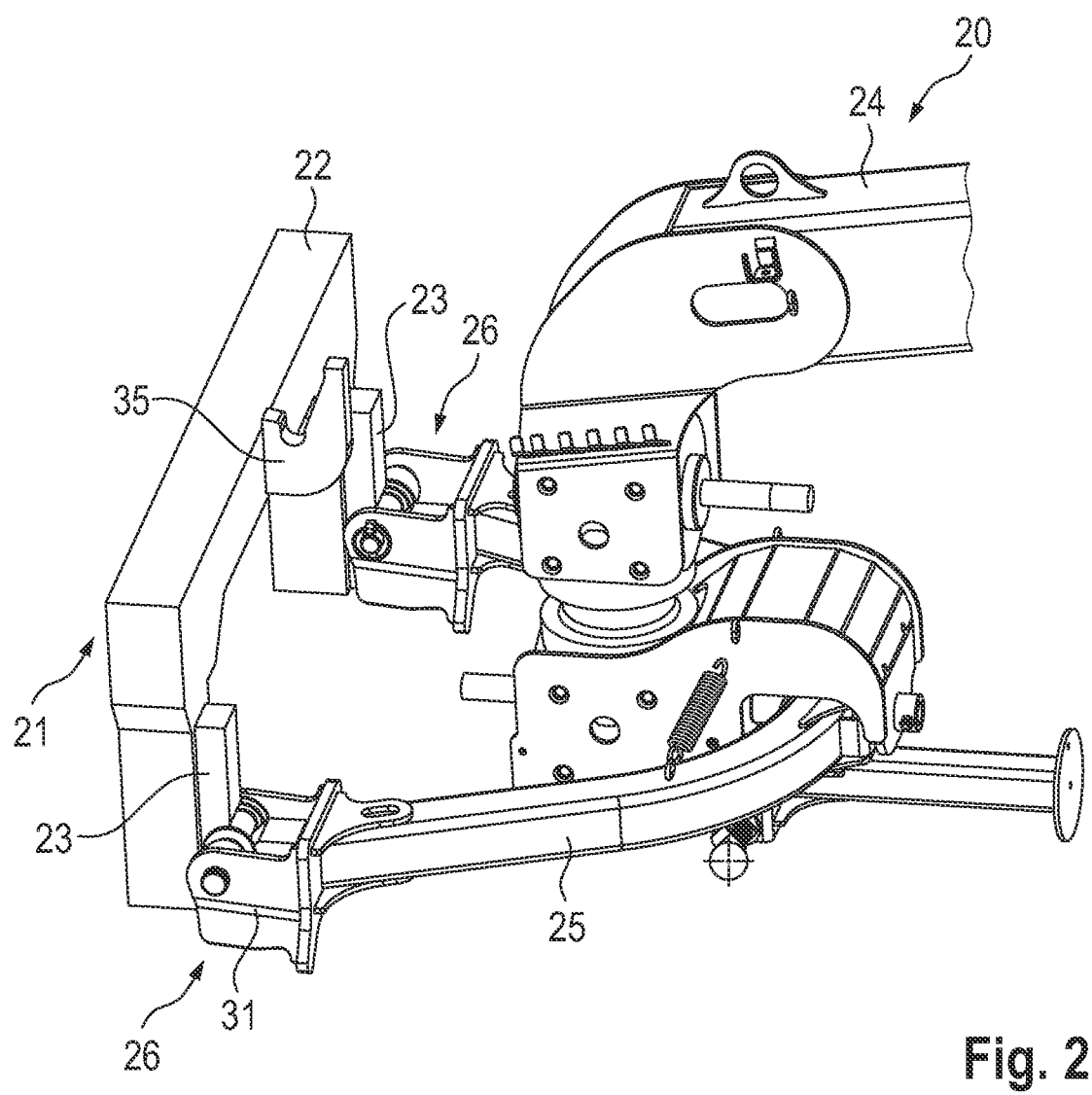
FIG. 2 shows a perspective view of FIG. 1.

FIGS. 1 and 2 show different views of a detail from an agricultural implement 20 together with an attachment system 21 of an agricultural support vehicle, wherein the agricultural implement 20 can be coupled via the attachment system 21 to the agricultural support vehicle, which is not illustrated in detail.

The attachment system 21 shown in FIGS. 1 and 2 is a US quick-hitch attachment system of Category 2 or Category 3N. This has a crossbeam 22 and hooks 23 fixed to one side of the crossbeam 22. A quick-hitch attachment system is usually arranged on a power lift system of a support vehicle, such as an agricultural tractor, for example.

Of the agricultural implement 20, a longitudinal member 24 and spars 25 acting laterally on the longitudinal member 24 are shown. At the free ends of the spars 25, the agricultural implement 20 has holders 26 for adapters 27, wherein adapters 27 received in the holders 26 are ultimately used to couple the agricultural implement 20 to the attachment system 21 of the agricultural support vehicle.

Figure 10:
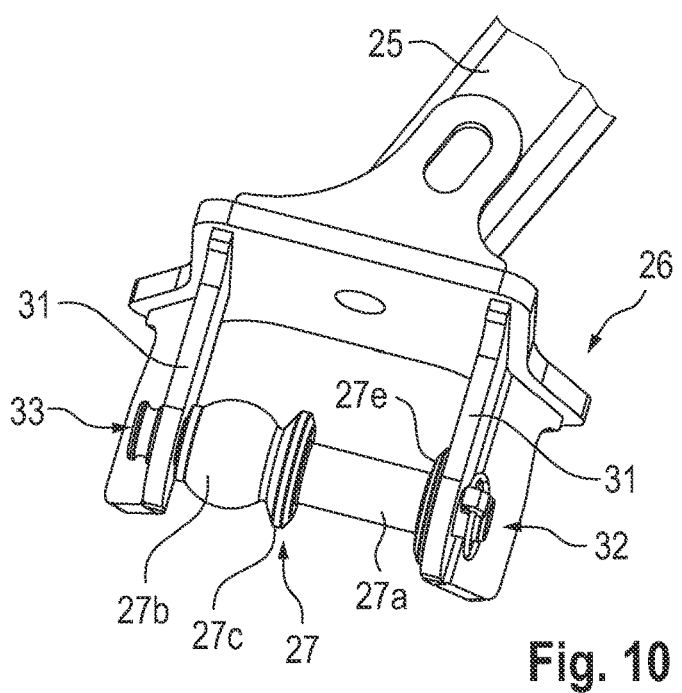
FIG. 10 shows a detail of FIGS. 1, 2, 7, 8 without attachment system.
Figure 11:
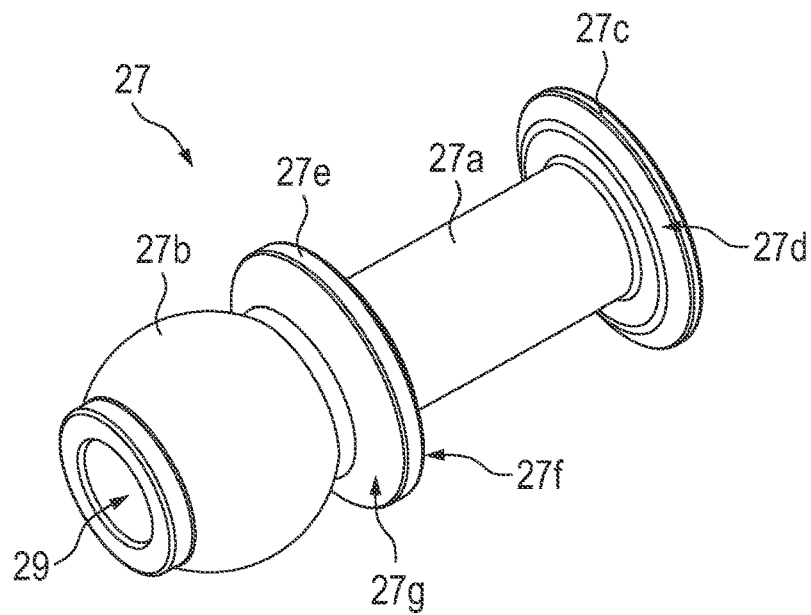
FIG. 11 shows the adapter according to the invention on its own in a perspective illustration
Figure 12:
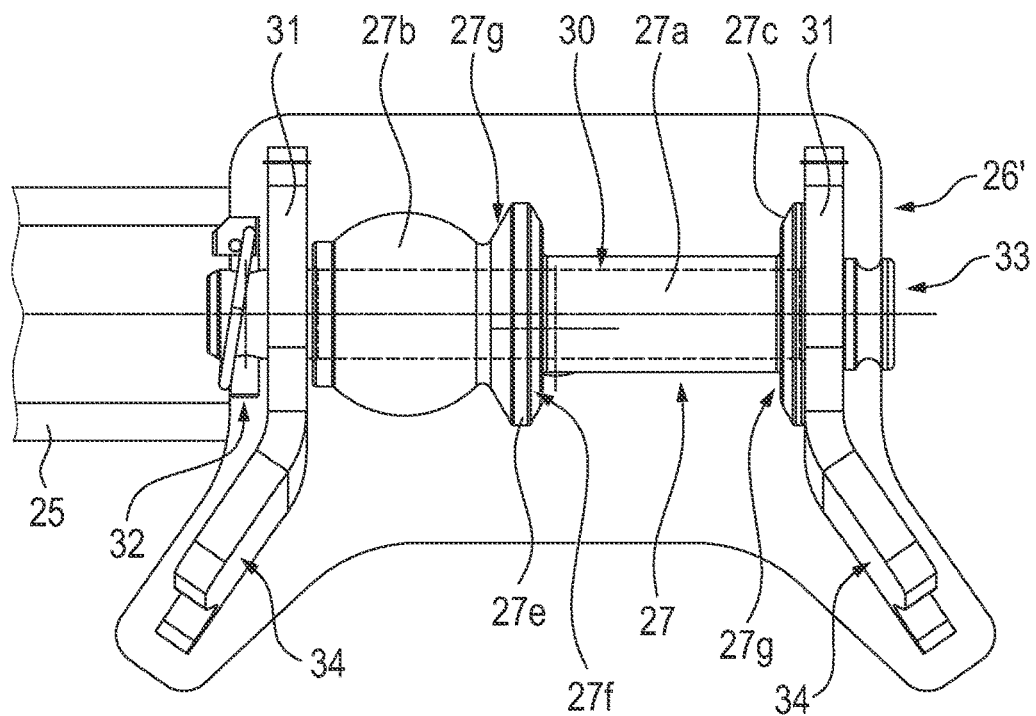
FIG. 12 shows a development of the invention.

In the sense of the present invention here, an adapter 27 is proposed which permits attachment of the implement 20 to different attachment systems of an agricultural support vehicle FIG. 11 shows this adapter 27 on its own in an illustration. FIGS. 10 and 12 show the adapter 27 together with a respective holder 26 and 26' of the implement 20.

Figure 3:
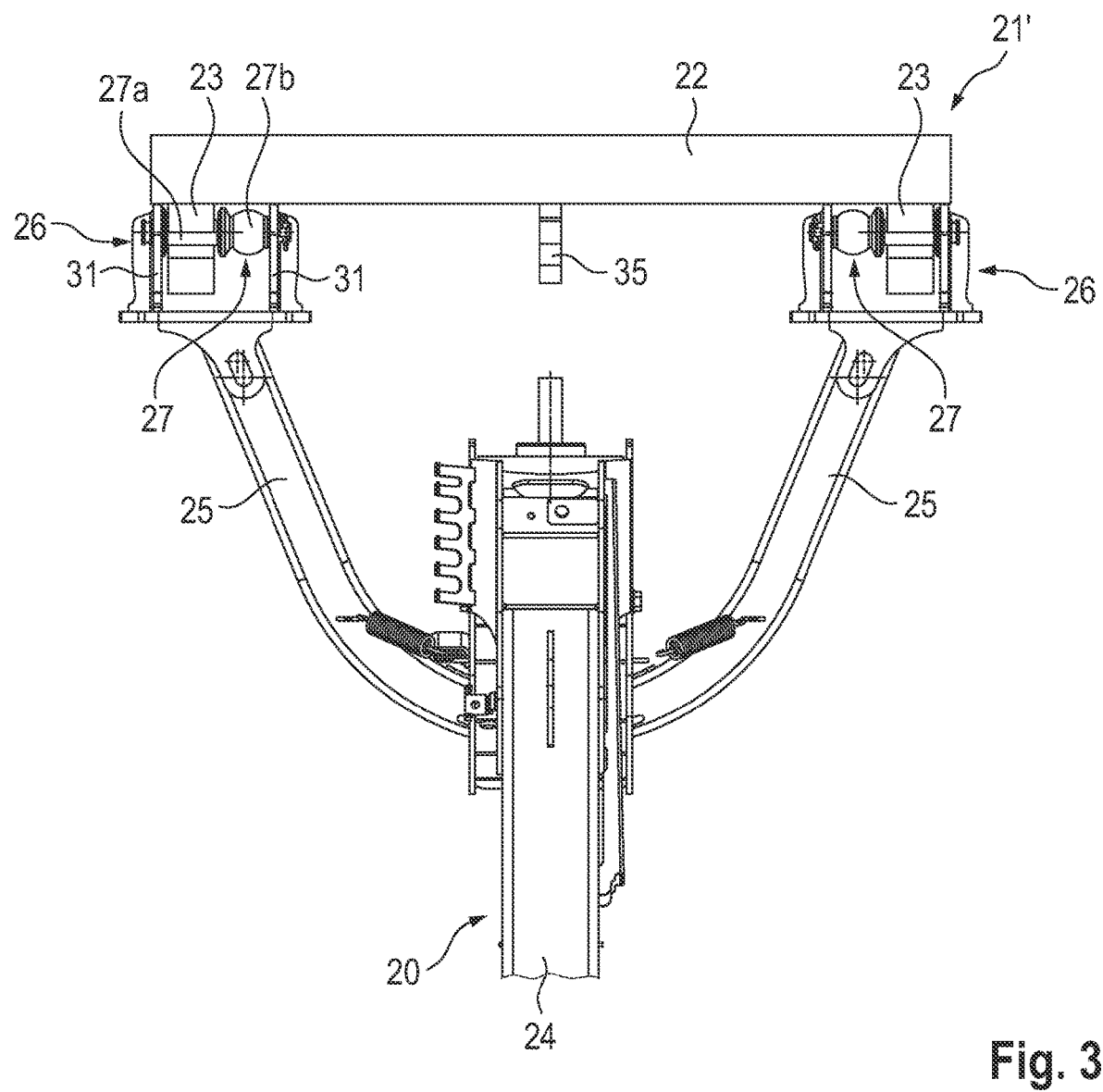
FIG. 3 shows a detail of an agricultural implement according to the invention together with a US quick-hitch attachment system of Category 3 in plan view.
Figure 4:
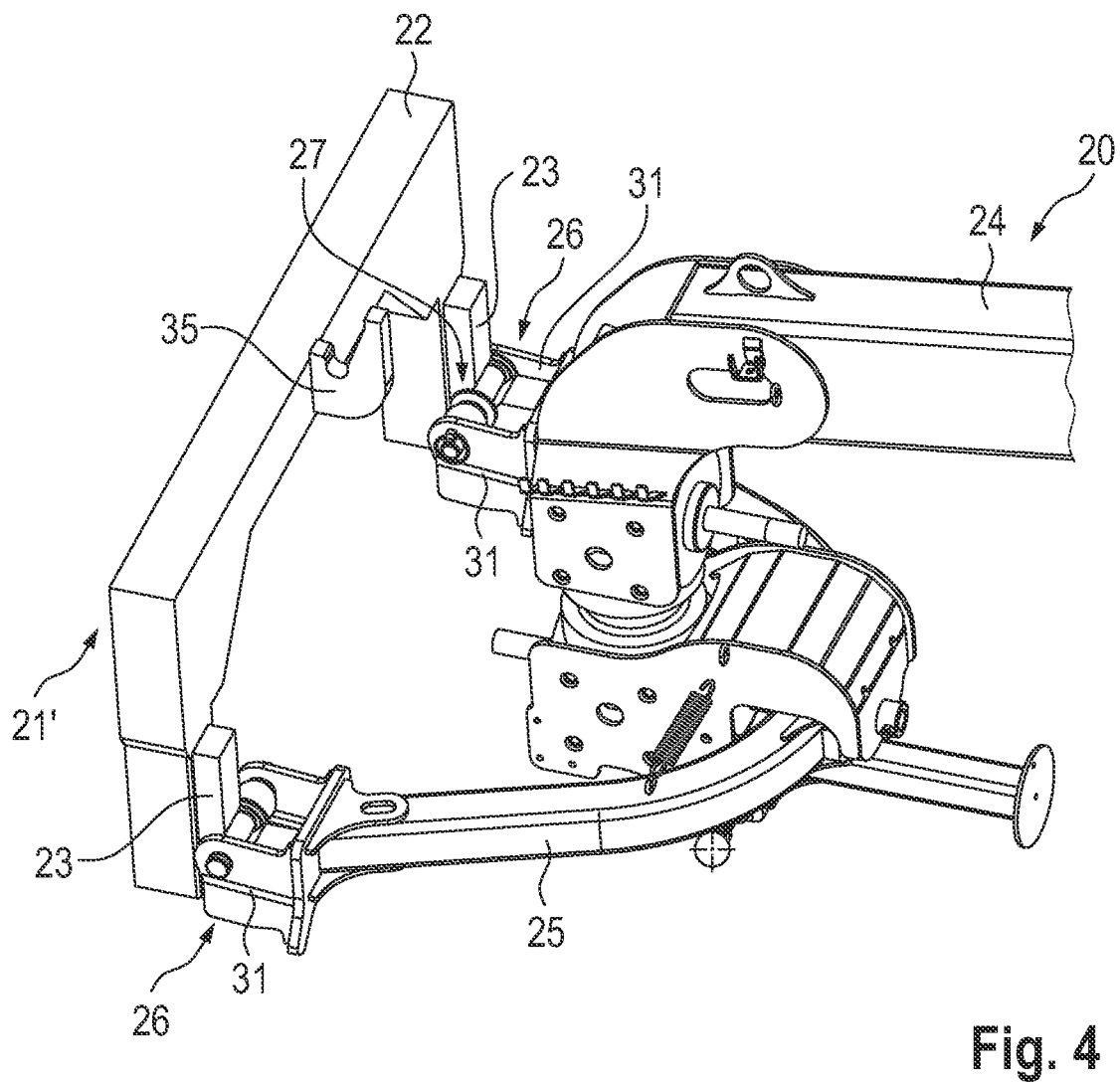
FIG. 4 shows a perspective view of FIG. 3.
Figure 13:
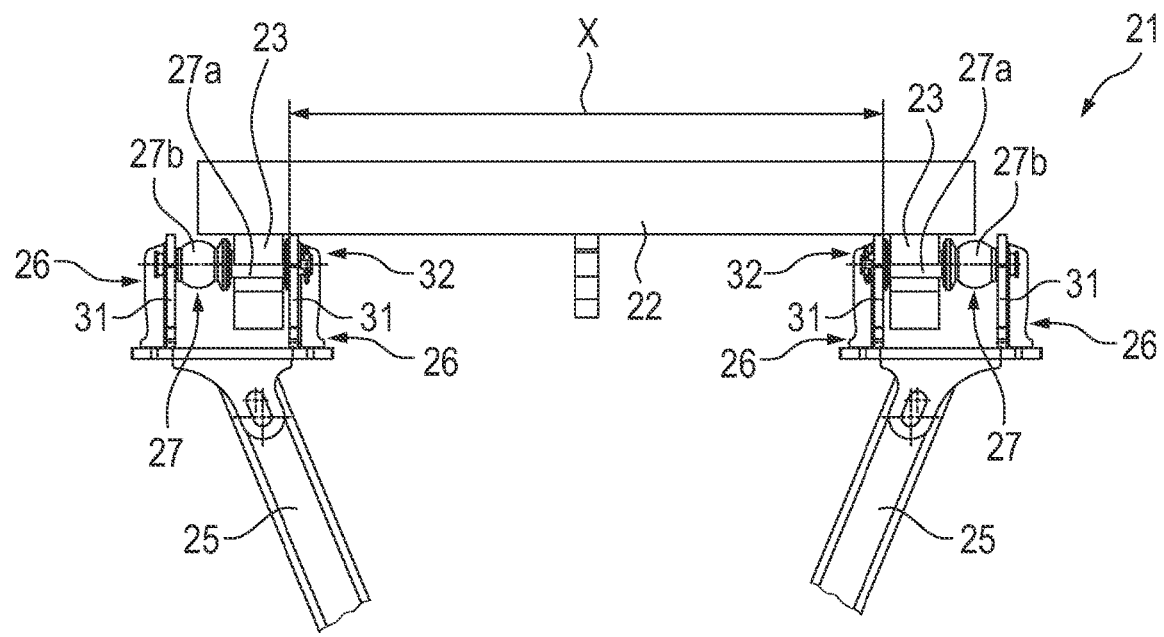
FIG. 13 shows a detail from FIG. 1 with a first dimension X.
Figure 14:
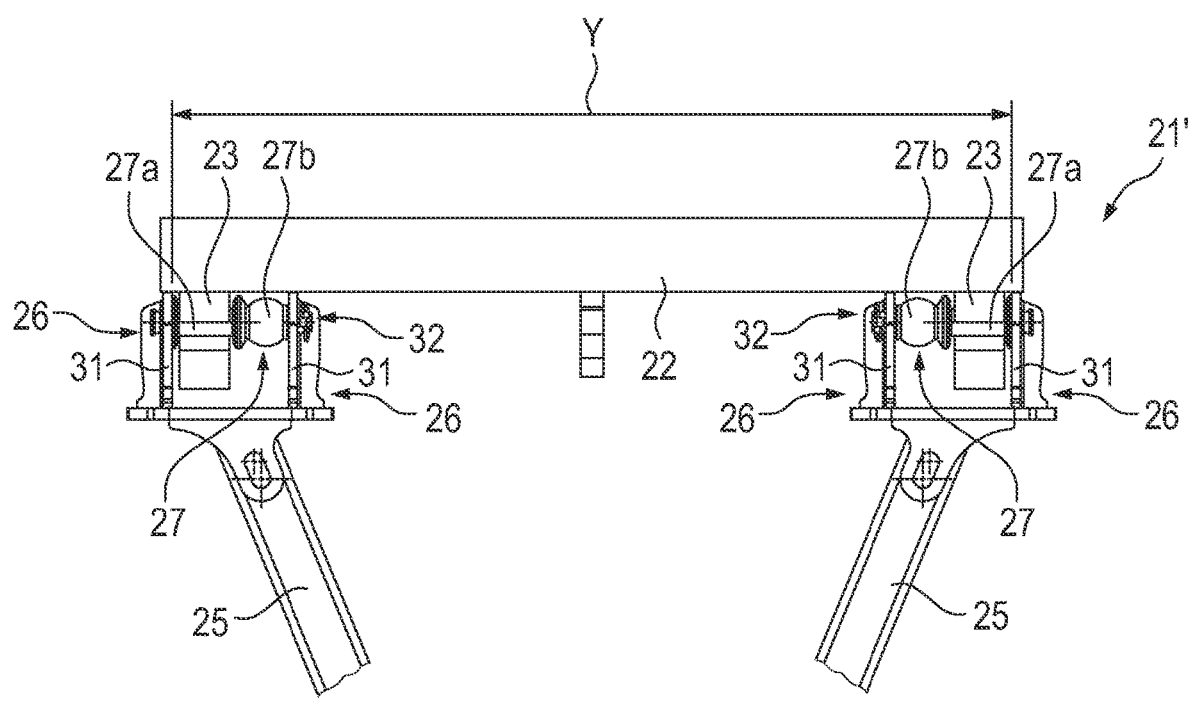
FIG. 14 shows a detail from FIG. 3 with a second dimension Y.

The adapter 27 has a first, cylindrically contoured section 27a, the external diameter of which is designed to couple the agricultural implement 20 which has such adapters to a US quick-hitch attachment system of an agricultural support vehicle, specifically in the variant of FIGS. 1, 2, 13, to a US quick-hitch attachment system 21 of Category 2 or Category 3N and, in the variant of FIGS. 3, 4 and 14, to a US quick-hitch attachment system 21' of Category 3. Such a US quick-hitch attachment system 21' of Category 3 in turn has a crossbeam 22 and hooks 23 arranged on one side of the crossbeam 22, wherein, in the US quick-hitch attachment system 21 of Category 2 or of Category 3N, the spacing between the hooks 23 is smaller than in the US quick-hitch attachment system 21' of Category 3.

Figure 5:
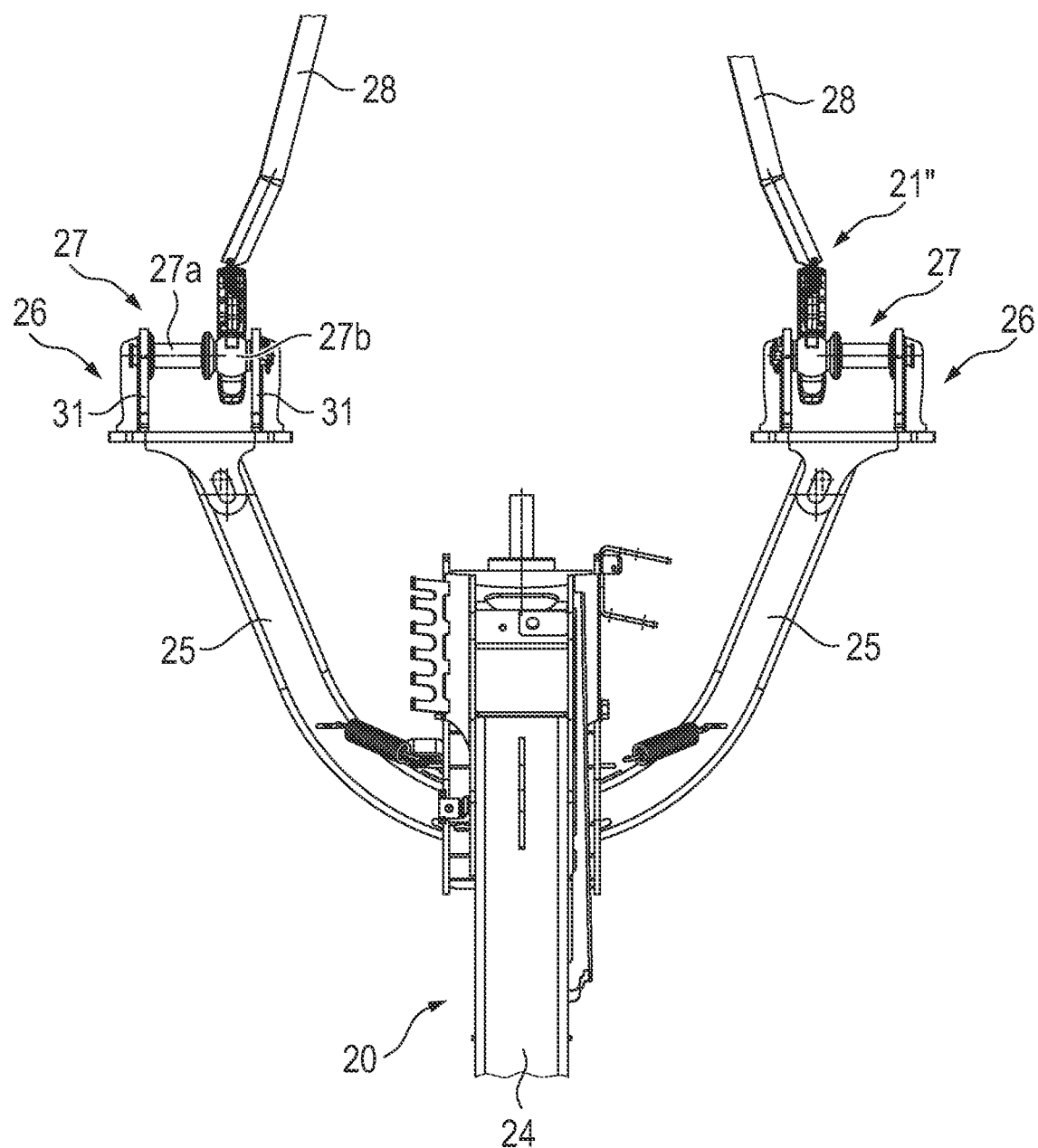
FIG. 5 shows a detail of an agricultural implement according to the invention together with a European lower-link attachment system of Category II in plan view.
Figure 6:
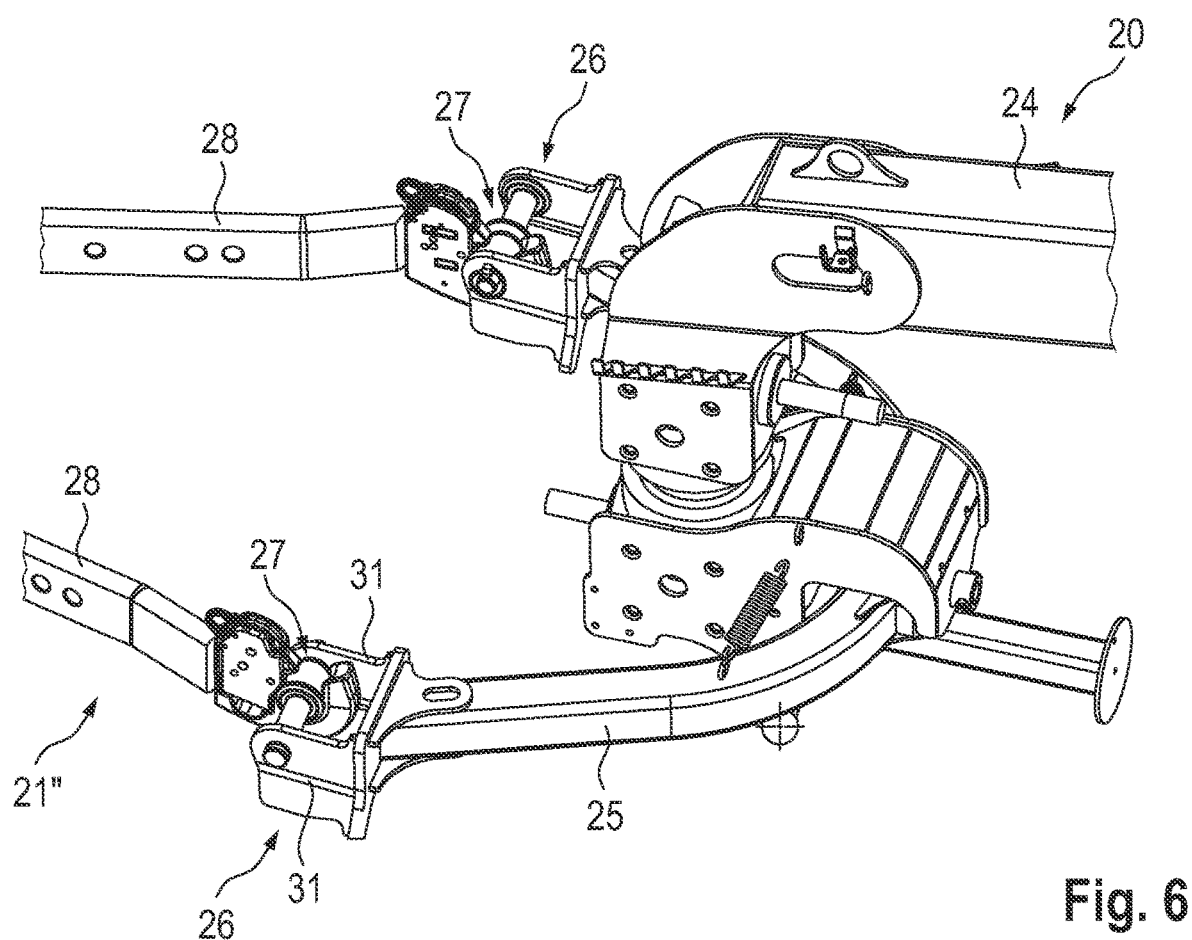
FIG. 6 shows a perspective view of FIG. 5.
Figure 7:
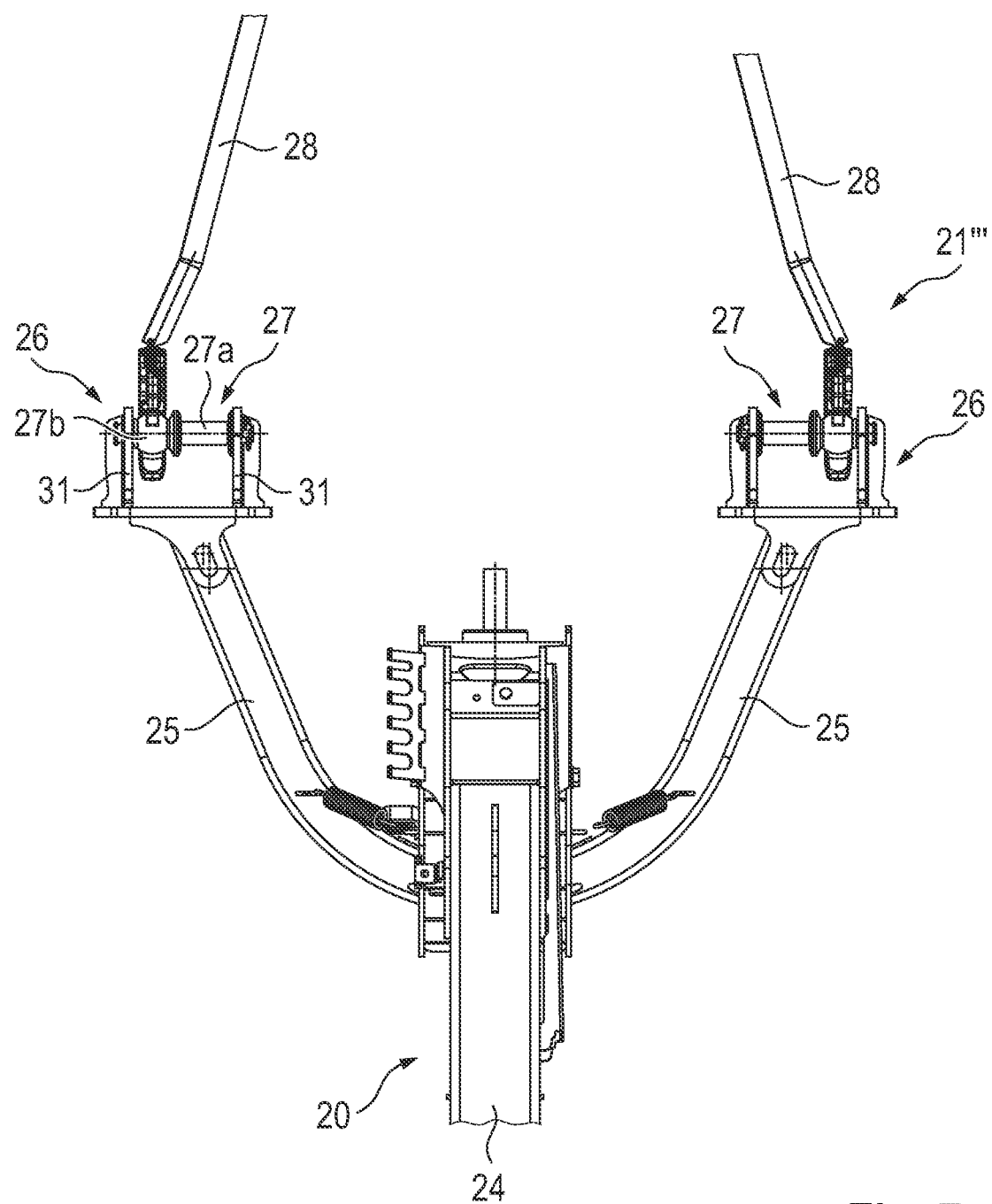
FIG. 7 shows a detail of an agricultural implement according to the invention together with a European lower-link attachment system of Category III in plan view.
Figure 8:
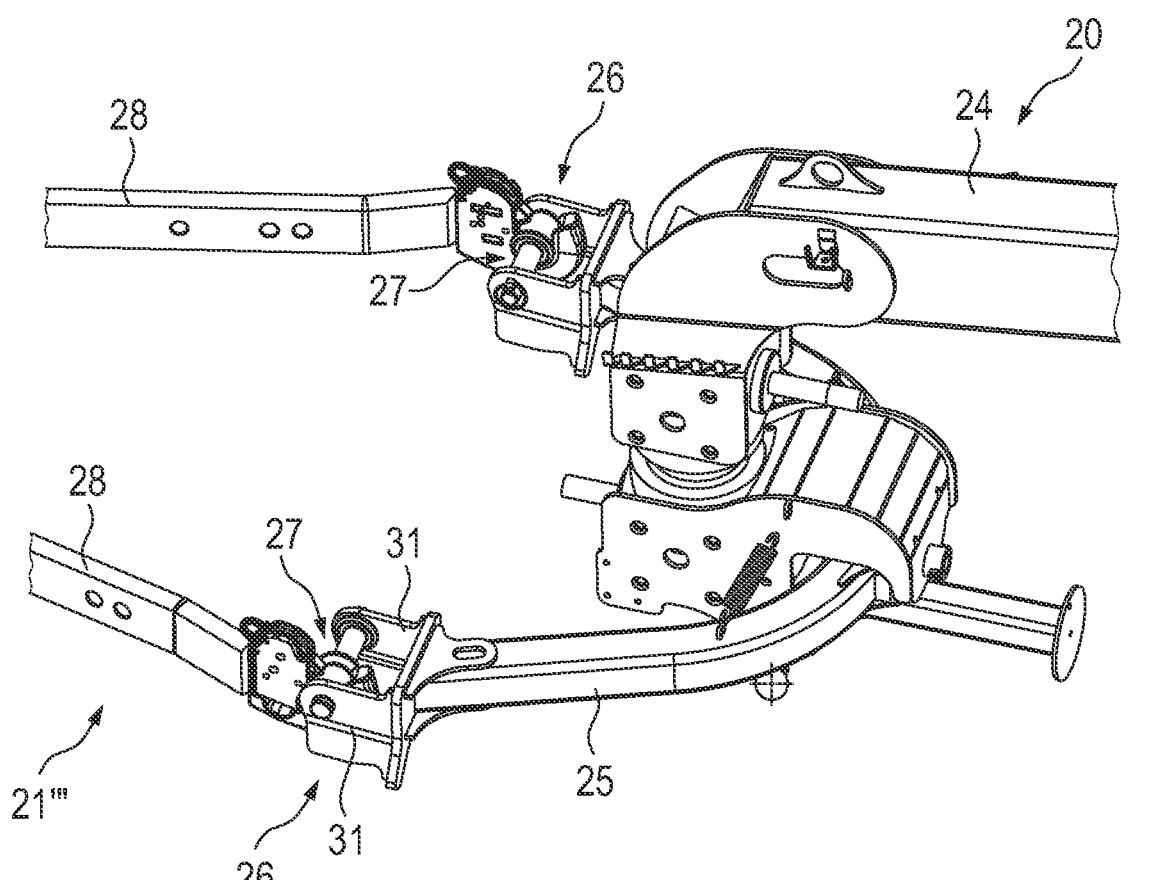
FIG. 8 shows a perspective view of FIG. 7.

In addition to this first, cylindrically contoured section 27a, the adapter 27 has a second, spherically contoured section 27b, the external diameter of which is designed to couple, via the adapter 27, the agricultural implement to a European lower-link attachment system of an agricultural support vehicle, specifically, in the variant of FIGS. 5 and 6, to a European lower-link attachment system 21" of Category II and, in the variant of FIGS. 7 and 8, to a European lower-link attachment system 21'" of Category III.

The European lower-link attachment systems 21" and 21'" shown in FIGS. 5, 6, 7 and 8 each have lower links 28 which differ with regard to their spacing from one another extending laterally or transversely with respect to the longitudinal direction, and which act on the second, spherically contoured sections 27b of the respective adapter 27 to couple an implement 22 to the support vehicle.

The two sections 27a, 27b of the adapter 27 are positioned beside each other.

The adapter 27 is particularly preferably formed as a one-piece or monolithic adapter bush which has a recess 29, via which the adapter bush can be pushed onto a carrier pin 30.

By pushing the adapter sleeve onto the respective carrier pin 30 in one of two possible relative positions offset by 180°, the respective adapter 27 can be used to attach the implement 20 to the different attachment systems 21, 21', 21" and 21'" of an agricultural support vehicle.

Should the adapters 27 be used to attach the implement 20 either, according to FIGS. 1 and 2, to a US quick-hitch attachment system 21 of Category 2 or Category 3N or, according to FIGS. 7 and 8, to a European lower-link attachment system 21'" of Category III, then the adapters 27 are mounted on the respective carrier pin 30 in such a way that, relative to the longitudinal member 24 of the implement 20, the spherical sections 27b point outward, and the cylindrically contoured sections 27a point inward.

If, on the other hand, in the sense of FIGS. 3 and 4, the adapters 27 are used to attach the implement 20 to a US quick-hitch attachment system of Category 3 or to attach the implement 20 to a European lower-link attachment system 21" of Category II, then the adapters 27 are mounted in such a way that, relative to the longitudinal member 24 of the implement 20, the spherically contoured sections 27b point inward and the cylindrically contoured sections 27a point or are directed outward.

The first, cylindrically contoured section 27a of the respective adapter 27 has an external diameter which corresponds to the diameter of the US quick-hitch attachment system. The diameters of the US quick-hitch attachment systems of Categories 2, 3N and 3 are identical; the same differ only with regard to the spacing of their hooks 23.

The external diameter of the spherical or spherically contoured sections 27b of the respective adapter 27 corresponds to the internal diameter of the European lower-link attachment systems of Categories II and III, which have identical internal diameters but differ from each other by the lateral spacing of the lower links 28 from each other.

On a first side of the cylindrically contoured section 27a, the adapter 27 has a first run-on disk 27c with a run-on bevel 27d facing the cylindrically contoured section 27a and, at an opposite, second end of the cylindrically contoured section 27a, specifically between the cylindrically contoured section 27a and the spherically contoured section 27b, a second run-on disk 27e with a run-on bevel 27f likewise facing the cylindrically contoured section 27a, and preferably also a run-on bevel 27g facing the spherically contoured section 27b. Via these run-on bevels 27d, 27f and 27g, the attachment of the attachment systems to the adapters 27 is made easier.

The cylindrically contoured section 27a of the respective adapter 27 has a length which corresponds to the width of a hook of the US quick-hitch attachment system 21 and 21', specifically in particular the length of a hook of the US quick-hitch attachment system 21 of Category 2 or Category 3N or the length of a hook 23 of the US quick-hitch attachment system of Category 3. The hooks 23 of these Categories 2, 3N and 3 of the US quick-hitch attachment system have identical lengths and identical internal diameters; as already explained, these categories of US quick-hitch attachment systems differ with regard to the spacing of the hooks 23.

The spherically contoured section 27b of the respective adapter 27 has an external diameter which corresponds to the internal diameter of the European lower-link attachment system 21" or 21'", wherein, as already explained, a European lower-link attachment system of Category III and a European lower-link attachment system of Category III have identical internal diameters; however the same differ with regard to the lateral spacing of the lower links 28.

Figure 9:
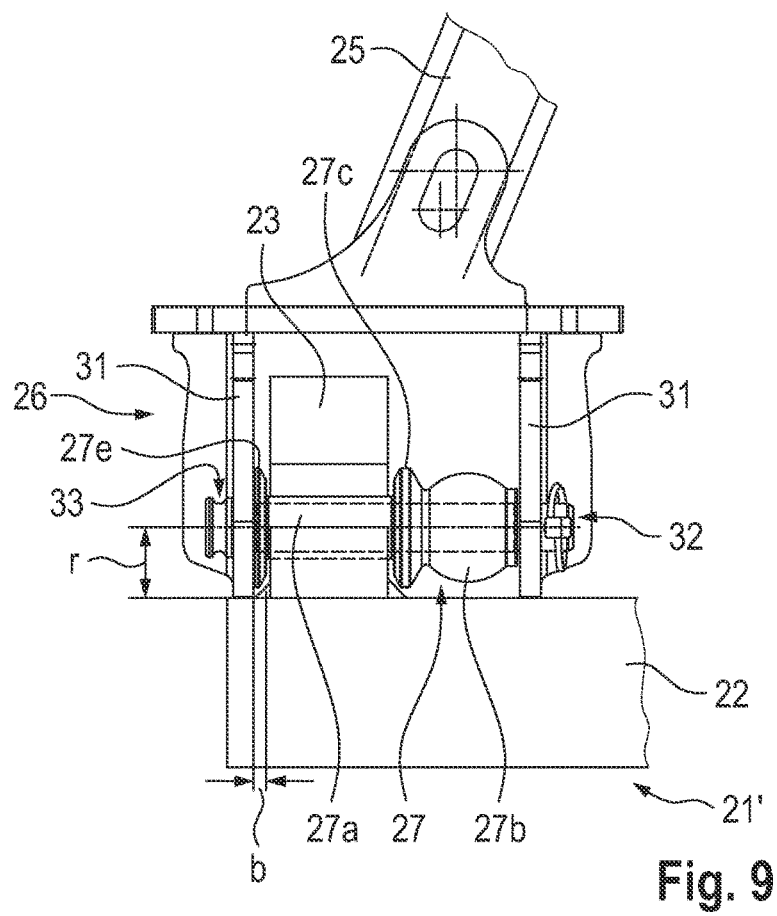
FIG. 9 shows a detail of FIGS. 5, 6 with attachment system.

The run-on disks 27c, 27e of the respective adapter 27 preferably have a defined width b (see FIG. 9), which is preferably between 2 mm and 6 mm, in particular between 3 mm and 5 mm, particularly preferably about 4 mm.

Furthermore, the run-on disks 27c, 27e have a radius r and therefore a diameter which corresponds approximately to the external diameter of the spherically contoured section 27b of the adapter 27, preferably is a few millimeters larger than the external diameter of the spherically contoured section 27b of the respective adapter 27.

The invention relates not only to the adapter 27 as such, which is preferably implemented as an adapter bush, but also to the agricultural implement 20 which receives and bears two such adapters 27 in corresponding holders 26 and 26'.

Each of the holders 26 and 26' which receives an above-described adapter 27 has two lugs 31 spaced apart from each other, wherein the respective carrier pin 30 for the respective adapter 27, which receives and bears the adapter 27 preferably formed as an adapter bush, extends through the opposite lugs 31 of the respective holder 26, 26'. At one end of a carrier pin 31, a cotter pin 32 for fixing the carrier pin 30 and therefore of the adapter bush 27 received by the carrier pin 32 acts on the respective holder 26, 26'. At an opposite end of the carrier pin 30, a preferably circumferential stop 33 in the form of a shoulder is formed, which limits the insertion depth of the respective carrier pin 27 into one of the lugs 31 and is thus likewise used for the positional fixing of the carrier pin 30 and therefore the adapter 27 received by the carrier pin 30 in the region of the respective holder 26. Alternatively, the carrier pin 30 could also be secured in its position on both sides by cotter pins 32.

In the agricultural implement 20, as can best be gathered from FIG. 13, the lugs 31 facing each other of the two holders 26 are spaced apart from each other by a spacing X which corresponds at most to an internal dimension of a hook spacing of the hooks 23 of the US quick-hitch attachment system 21 of Category 2 or Category 3N. A spacing Y between the lugs 31 facing away from each other of the two holders 26 corresponds at least to the external dimension of the hook spacing of the hooks 23 of the US quick-hitch attachment system of Category 3 or the internal dimension of the hook spacing plus twice the hook width of the hooks 23.

The invention is preferably used in agricultural implements 20 which in particular are designed as a mowing machine, swather, merger or tedder 36.

To make it easier to couple the respective attachment system of the agricultural support vehicle to the adapters 27 which are held in the holders 26, according to the development of the invention shown in FIG. 12 provision is made for the lugs 31 of the holder 26' shown there to form insertion bevels 34 which, in particular, interact with the hooks 23 of a US quick-hitch attachment system 21 or 21'.

According to an advantageous development of the invention, provision is made for the implement 20 to have, in particular in the area of its longitudinal member 24, a holder to which in particular an upper hook 35 of a US quick-hitch attachment system 21 or 21' or an upper link, not shown, of a European attachment system can be attached.

By using the invention, it is possible to couple an implement 20 to different attachment systems of an agricultural support vehicle via a single adapter.

LIST OF DESIGNATIONS

20 Implement
21 Attachment system
21' Attachment system
21" Attachment system
21'" Attachment system
22 Crossbeam
23 Hook
24 Longitudinal member
25 Spar
26 Holder
26' Holder
27 Adapter
27a Section
27b Section
27c Run-on disk
27d Run-on disk
27e Run-on disk
27f Run-on bevel
27g Run-on bevel
28 Lower link
29 Recess
30 Carrier pin
31 Lug
32 Cotter pin
33 Stop
34 Insertion bevel

The invention claimed is:

1. An adapter (27) of an agricultural implement comprising:
a first cylindrically contoured section (27a), an external diameter of which is designed to couple the agricultural implement to a US quick-hitch attachment system of an agricultural support vehicle; and
a second spherically contoured section (27b), an external diameter of which is designed to couple the agricultural implement to a European lower-link attachment system of an agricultural support vehicle, wherein the first cylindrically contoured section (27a) and the second cylindrically contoured section (27b) are a one-piece adapter bush which has a recess (29) into which a carrier pin (30) can be pushed.

2. The adapter according to claim 1, characterized in that the two sections (27a, 27b) are arranged beside each other.

3. The adapter according to claim 1, characterized in that a first run-on disk (27c) with a run-on bevel (27d) facing the cylindrically contoured section (27a) is formed on a first side of the cylindrically contoured section (27a), and in that a second run-on disk (27e) having a run-on bevel (27f) facing the cylindrically contoured section (27a) is formed on a second side of the cylindrically contoured section (27a).

4. The adapter according to claim 3, characterized in that the second run-on disk (27e) also has a run-on bevel (27g) facing the spherically contoured section (27b).

5. The adapter according to claim 3, characterized in that the run-on disks (27c, 27e) have a width between 2 mm and 6 mm.

6. The adapter according to claim 5, wherein the run-on disks (27c, 27e) have a width between 3 mm and 5 mm.

7. The adapter according to claim 1, characterized in that the cylindrically contoured section (27a) has a length which corresponds to the width of the US quick-hitch attachment system, which includes the length of a US quick-hitch attachment system of Category 2 or Category 3N or Category 3.

8. The adapter according to claim 1, characterized in that the spherically contoured section (27b) has a diameter which corresponds to the diameter of the European lower-link attachment system, which includes the diameter of a European lower-link attachment system of Category II or Category III.

9. An agricultural implement comprising:

holders (26, 26'); and adapters (27) according claim 1, which are mounted on the holders (26, 26').

10. The agricultural implement according to claim 9, characterized in that each of the holders (26, 26') have two lugs (31) spaced apart from each other on which a respective adapter (27) is mounted.

11. The agricultural implement according to claim 10, characterized in that a carrier pin (30) extends through the lugs (31) of each of the holders (26, 26').

12. The agricultural implement according to claim 10, characterized in that a spacing (X) between the lugs (31) closest to one another on opposing holders (26, 26') corresponds at most to an internal dimension of a hook spacing of the US quick-hitch attachment system of Category 2 or 3N, a spacing (Y) between the lugs (31) farthest away from each other on opposing holders (26, 26') corresponds at least to an external dimension of the hook spacing of the US quick-hitch attachment system of Category 3.

13. The agricultural implement according to claim 10, characterized in that the lugs have insertion bevels (34).

14. The agricultural implement according to claim 10, characterized in that the agricultural implement is a mowing machine or a swather or a merger or a tedder.

* * * * *